US007043695B2

(12) United States Patent
Elber et al.

(10) Patent No.: US 7,043,695 B2
(45) Date of Patent: May 9, 2006

(54) OBJECT POSITIONING AND DISPLAY IN VIRTUAL ENVIRONMENTS

(75) Inventors: Gershon Elber, Haifa (IL); Michael Gertelman, Haifa (IL); Orit Shaked, Nofit (IL); Oded Shmueli, Nofit (IL)

(73) Assignee: Technion Research & Development Foundation Ltd., Haifa (IL)

( * ) Notice: Subject to any disclaimer, the term of this patent is extended or adjusted under 35 U.S.C. 154(b) by 238 days.

(21) Appl. No.: 09/887,040

(22) Filed: Jun. 25, 2001

(65) Prior Publication Data
US 2002/0033845 A1 Mar. 21, 2002

Related U.S. Application Data

(60) Provisional application No. 60/233,487, filed on Sep. 19, 2000.

(51) Int. Cl.
*G09G 5/00* (2006.01)
(52) U.S. Cl. ............... 715/771; 715/767; 715/761; 715/769; 715/799; 345/427; 345/418; 345/419; 345/619; 345/679; 345/630
(58) Field of Classification Search ............ 345/764, 345/582, 473, 428, 427, 419, 418, 619, 679, 345/630; 715/769, 778, 850–852, 761–767, 715/771–773, 799
See application file for complete search history.

(56) References Cited

U.S. PATENT DOCUMENTS 5,736,990 A * 4/1998 Barrus et al. ............... 345/630
5,894,310 A * 4/1999 Arsenault et al. ........... 345/679
6,100,896 A * 8/2000 Strohecker et al. ......... 345/427
6,552,722 B1 * 4/2003 Shih et al. .................. 345/419
6,629,065 B1 * 9/2003 Gadh et al. .................... 703/1
6,781,597 B1 * 8/2004 Vrobel et al. ............... 345/619
2001/0041328 A1 * 11/2001 Fisher ......................... 434/157
2001/0045949 A1 * 11/2001 Chithambaram et al. ... 345/418

OTHER PUBLICATIONS

Rich Hilliard, "Views and Viewpoints in Software Systems Architecture," pp. 1-10, Feb. 1999.*
Stuart Pook et al., "Control Menus: Execution and Control in a Single Interactor," pp. 263-264, CHI 2000 Extended Abstracts (ACM press), The HAgue, The Netherlands, Apr. 1-6, 2000.*
Satyan Coorg and Seth Teller, "Real Time Occlusion Culling for Models with Large Occluders," pp. 83-90 and 189, 1997 ACM Symposium on interactive 3D Graphics.*
Thomas A. Funkhouser, "RING: A Client-Server for Multi-User Virtual Enviroments," 1995.*

* cited by examiner

*Primary Examiner*—Tadesse Hailu

(57) ABSTRACT

A virtual environment for user interaction, and virtual objects for use therein, the virtual objects having an internal co-ordinate system with natural language definition to allow simplified inter-object relationships. The internal co-ordinate system is used to define docking positions for connecting to other objects to allow logical or natural positional relationships. A dynamically defined menu system allows pop-up menus for simple user entry of required relationships.

46 Claims, 11 Drawing Sheets

Virtual Object (with Relative Positioning Mechanism) 900

Visible Appearance Elements 910
Preselected Position 915
Bounding Box 920

Height 922
Width 924
Depth 926

Function and Behavioral Aspects 930
Absolute Position 940
Relative Positioning Mechanism 950

Prior Art Virtual Object 800

Visible Appearance Elements 810
Centroid 815
Bounding Box 820

Height 822
Width 824
Depth 826

Function and Behavioral Aspects 830
An Absolute Position 840

Fig. 7

Virtual Object (with Relative Positioning Mechanism) 900

Visible Appearance Elements 910
Preselected Position 915
Bounding Box 920

Height 922
Width 924
Depth 926

Function and Behavioral Aspects 930
Absolute Position 940
Relative Positioning Mechanism 950

Fig. 8

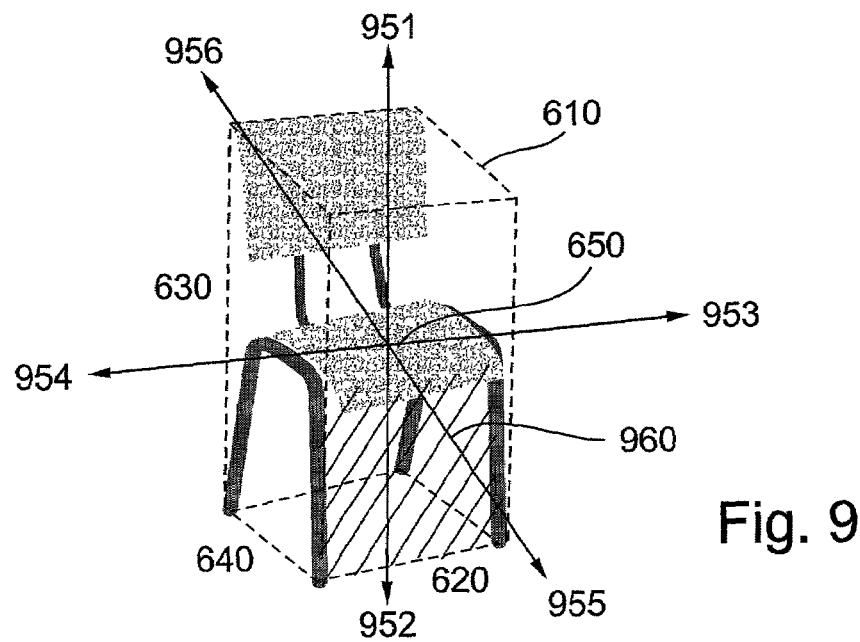

Fig. 9

OBJECT POSITIONING AND DISPLAY IN VIRTUAL ENVIRONMENTS

RELATIONSHIP TO EXISTING APPLICATIONS

The present application claims priority from U.S. Provisional Patent Application No. 60/233,487 filed Sep. 19, 2000.

FIELD OF THE INVENTION

The present invention relates to interaction with and positioning of virtual objects in virtual environments, and more particularly to permissible movements of Three Dimensional (hereinafter 3D) objects in 3D environments.

BACKGROUND OF THE INVENTION

Computer applications are often graphics based, and may; using what is commonly termed virtual reality, give an illusion of 3D space by situating virtual objects on a virtual 3D grid. Using immersion equipment, users can interact directly with this virtual environment. Additionally or alternatively, the 3D space can be projected on to a substantially flat or 2D surface such as a computer visual display unit (VDU), thus virtual reality may be viewed on substantially 2D computer screens, nevertheless, an illusion of solidity is maintained, and virtual objects will have in addition to height and width, an apparent depth. These objects move with respect to backgrounds or scenes, which may be viewable from different angles, and if the viewing angle is changed, the whole scene is rotated in consequence.

Computer graphics applications tend to be data heavy applications, comprising very large amounts of data. Data intensiveness is particularly true for applications involving virtual reality with moving images. 3D environments, where changes of viewing position typically require redrawing of both the background and foreground objects displayed thereon are particularly data intensive. In general, the more accurately virtual elements reflect reality, the more data is required to define them and the more effort is required to manipulate the data and display them.

As illustrated in FIG. 1, which shows schematically the inter-relationship between clients and server in networked computing environments, networked computing comprises a plurality of remote terminals or clients interacting with the same computer application, the bulk of which usually runs on a host computer known as the server. The clients and the server are interconnected via a network. The individual clients are often at a considerable distance from each other and from the host server on which the application is based.

Where an application permits a plurality of users to view the same graphic interface, and where each terminal interface is updated regarding interactions in real time, the currently viewed scene may require changes that are generally implemented by regeneration of the scene. This may require all the data required for the scene display to be transferred via the network to each terminal.

Now the speed at which a computer application runs is a function of its complexity and the capability of the hardware. In networked computing however, particularly with data-intensive, heavy applications, the speed at which applications run, is often limited by the time required for necessary data to be transferred between users on remote terminals, and/or between those remote terminals and the host computer. This data transfer time is a function of the bandwidth of the data transfer lines, and of the volume of data that requires transporting. Clearly there is a desire to limit the quantity of data that is transported between client and host, and efficient programming and data compression techniques are used to facilitate this data limiting. The Internet is a multi-client computing environment that potentially allows many users to interact with each other using the same application, enabling many players to play the same adventure game for example. To facilitate multiplayer interaction in a 3D virtual graphic environment in real-time, it is required that changes or moves made by one user, are transmitted to other users fast enough that correct sequencing is maintained, and preferentially the moves of one player appear instantaneously on the monitors of all other players. Achieving real-time updating of high-resolution 3D graphical displays to a plurality of users is a challenging aim.

Apart from games and the like, virtual reality has also been applied to a variety of areas of human endeavor to simulate reality where, due to economic, safety and other considerations, in has been deemed preferable to use simulations rather than the real thing. Examples of this include anatomical simulations of the human body for pedagogic purposes in the training of doctors and surgeons, design of objects for manufacture, on-line guidance, such as computer printer setups and maintenance, flight simulators for training aircraft pilots, and battlefield simulation for training the military, particularly tank drivers and artillery personnel.

A widely used approach to generating apparently 3D scenes for viewing on a 2D VDU is to plot the scene using a 3D co-ordinate system. Possible co-ordinate systems include for example, Cartesian and polar coordinate systems as well as spherical, cylindrical, tetragonal and hexagonal systems. A Cartesian coordinate system is shown, purely by way of example, in FIG. 2. The x-axis and y-axis are orthogonal, and represent the plane of the screen. The z-axis, representing depth, is drawn at an angle to indicate the out-of-plane dimension. In addition to Cartesian co-ordinates, other co-ordinate systems such as polar may be considered.

Placing objects within a scene drawn on such Cartesian axes, has, in the prior art, been accomplished by defining a centroid for each object, and plotting the centroid of each object onto the same coordinate system. When objects are moved, the scene is usually redrawn.

Positioning objects via their centroids within a 3D coordinate system, and then projecting the position onto a 2D screen has several drawbacks however. There is often a problem of positioning due to an ambiguity as to the true position of objects; that is at what depth into the scene objects are situated. There is also an ambiguity as to relative depth of different objects. The cursor moves in the plane of the two-dimensional screen of the VDU, but is used to manipulate objects in a three-dimensional space. In consequence, positioning objects correctly is not easy. In the real world, the viewer, having stereoscopic vision, is, at short distances, sensitive to depth. In virtual reality however, without stereoscopic display capability, perspective is merely an illusion, and it is difficult to tell which of two objects, placed in the foreground of a scene, is to be considered closer and which is to be considered further away from the viewer.

A further problem, which arises from the fact that the observer has only one viewpoint, is illustrated in FIGS. 3 and 4, representing different perspective viewpoints of a stack of blocks. FIG. 3 shows what appears to be a well-stacked tower of blocks as viewed from the front, whereas FIG. 4 shows the same scene from an alternative viewpoint, a few degrees in a clockwise direction, revealing that the bricks are not correctly stacked, as the user intended, but are rather staggered.

There are thus difficulties in navigating and positioning 3D objects in a virtual 3D scene, when viewing said scene on a 2D monitor. The impression of the relative position of virtual 3D objects in a 3D scene is a function of viewpoint.

A further example of the type of difficulties encountered is illustrated in FIGS. 5 and 6, which show a table lamp and a table. In FIG. 5, the lamp appears to rest on the table, the said lamp appearing to be centrally positioned and resting on the tabletop. In FIG. 6 however, showing the same view from a vantage point at tabletop height, the lamp is revealed to be 'floating' above the tabletop, separated from the tabletop by a gap.

A useful Software platform for virtual reality applications is GInIt. This has been disclosed; See Shmueli and Elber, [Shmueli O. and Elber G., Managing Data and Interactions in Three Dimensional Environments. Software for Communication Technologies—3$^{rd}$ Austrian-Technion Symposium, Lintz, Austria, April 1999], which is incorporated herein by reference.

A solid modeler in general supports both form and function of objects, thus virtual doors can open and bells can chime, and punching numbers onto a virtual telephone, enables real dialing to be accomplished.

SUMMARY OF THE INVENTION

It is an aim of the present embodiments, to allow users to interact with objects within a virtual reality scene.

It is a further aim of the present embodiments, to eliminate ambiguity in the relative position of virtual objects.

It is a further aim of the present embodiments, to enable virtual objects to be positioned correctly, and to enable 3D objects to be easily manipulated, in a meaningful way, according to the user's wishes, using a 2D projection.

It is a further aim of the present embodiments, to allow a first object to be easily placed in a desired position within a scene, such that all viewers, from all possible viewing angles, see the first object as being substantially in that desired position, thus overcoming the problem that the placing of an object within a 3D scene using 2D viewing is ambiguous.

It is a further aim of the present embodiments that objects display logically, as will be explained later on.

It is a further aim of the present embodiments, to allow a first object to be easily placed in a desired position with respect to a second object within a scene, using standard devices commonly used for object manipulation, such as a computer mouse, for example.

It is a further aim of the present embodiments, to allow different users to interact according to different instructions, each according to prescribed limitations, which may either be predefined, or dynamically determined, or some combination thereof. These instructions need not be the same for each user.

It is a further aim of the present embodiments, to minimize the necessary data to be transferred to and from client terminals, after an application has been initiated, to enable the application to run smoothly in real-time.

These and other aims of the present invention will become clear from the following description.

According to a first aspect of the present invention there is thus provided a virtual object for use in a virtual environment, the virtual object comprising at least a visible appearance element, and an internal coordinate system for positioning within said virtual environment with respect to said virtual object.

Preferably, said internal coordinate system comprises unit lengths defined in terms of dimensions of a bounding shape of said virtual object.

Preferably, said bounding shape has a width, a height and a depth, and said internal coordinate system comprises axes having a fixed direction with respect to directions of said width, height and depth.

The internal co-ordinate system is preferably any one of a polar coordinate system, a Cartesian coordinate system, a cylindrical coordinate system, a tetragonal coordinate system, and hexagonal coordinate system.

Preferably, the embodiment is movable to positions, in said virtual environment, expressed in terms of said width, said height and said depth.

Preferably, said expressions of said locations comprise natural language descriptions for each direction.

Preferably, said natural language descriptions are selected from a group comprising left, leftwards, port, right, rightwards, starboard, up, upwards, above, down, downwards, below, forwards, near, ventral, fore, backwards, aft, dorsal, North, Northwards, Northerly, South, Southwards, Southerly, East, Eastwards, Easterly, West, Westwards, Westerly, North-Easterly, North-Westerly, South-Easterly, South-Westerly, and synonyms, combinations and translations thereof.

Preferably, said position is a preferred position for positioning another virtual object.

Preferably, said location is a preferred position for repositioning said virtual object.

Preferably, the virtual object has a designated location associated therewith, an anchor position or a docking position for selective positioning of another object thereat, so that said virtual object and said other virtual object are logically displayed according to positioning logic associated with said virtual environment.

Preferably, said designated location associated therewith is compatible with an unrestricted range of objects.

Preferably, said designated position associated therewith for selective positioning of a second object thereat is selectively compatible with a subset of objects.

According to a second aspect of the present invention there is provided at least a first virtual object and a second virtual object and a relationship between them, wherein said relationship is usable to select said second object. This may be done explicitly or using a logical query or the like.

Preferably, said relationship between said first virtual object and said second virtual object is a positioning relationship.

According to a third aspect of the present invention there is provided a virtual environment comprising at least two virtual objects and having a series of potential relationships between said virtual objects, each object comprise a tool tip facility and being selectable to display a tooltip, via said tooltip facility, said tooltip indicating at least some of said potential relationships.

Preferably, said indicated relationships are selectable from said tooltip.

Preferably, said tooltip is displayable automatically upon a cursor passing over said virtual object.

Preferably, said relationship is a positioning relationship via a predetermined preferential location associated with said second virtual object.

Preferably, said predetermined preferential location has a specific nature, selectively accepting predetermined types of objects.

Preferably, the virtual environment is common to a plurality of users.

Preferably, an interaction by a first user is detectable by at least a second user.

Alternatively, an interaction by a first user is not detectable by at least a second user.

Preferably, said first object comprises at least a visible appearance element, and an internal coordinate system.

Preferably, said associated coordinate system is selected from a polar coordinate system, a Cartesian coordinate system, a cylindrical coordinate system, a tetragonal coordinate system, and hexagonal coordinate system.

Preferably, said virtual object further comprises a bounding shape having a width, a height and a depth, and said associated coordinate system has axes having a fixed direction with respect to directions of said width, height and depth.

Preferably, locations in the vicinity of said object, are expressible in terms of said width, said height and said depth.

Preferably, said expressions of said locations comprise units for each direction with respect to a corresponding dimension of said boundary box.

Preferably, said expressions of said locations comprise natural language descriptions for each direction.

Preferably, as above, natural language descriptions are selected from a group comprising left, leftwards, port, right, rightwards, starboard, up, upwards, above, down, downwards, below, forwards, near, ventral, fore, backwards, aft, dorsal, North, Northwards, Northerly, South, Southwards, Southerly, East, Eastwards, Easterly, West, Westwards, Westerly, and synonyms, combinations and translations thereof.

Preferably, said location is a preferred position for positioning other objects thereat.

Preferably, the first virtual object has a designated location associated therewith for selective positioning of a second object thereat, so that first virtual object and second virtual object are logically displayed according to positioning logic associated with said virtual environment.

Preferably, said first virtual object has a designated location associated therewith for selective positioning of a second object thereat, where said designated location is compatible with any object.

Preferably, said designated location associated therewith for selective positioning of a second object thereat is selectively compatible with a subset of objects.

According to a further aspect of the present invention there is provided a method for moving a first virtual object from a first position to a selected second position associated with a second virtual object, within a virtual environment, each virtual object being approximated by a bounding box and having an internal co-ordinate system, the method comprising:
  selecting said first object,
  defining a move of said first object into proximity of said second object using said first object internal co-ordinate system,
  operatively associating said first object with said second object, and
  positioning said first object with respect to said second object in terms of said internal co-ordinate system.

Preferably, the method further comprises automatically adjusting positioning of said first object with respect to said second object so that said first object and said second object are logically displayed.

Preferably, said automatic adjustment comprises associating said first object with a predetermined position on said second object and repositioning said first object to locate onto said predetermined position.

According to a further aspect of the present invention there is provided a method for constructing a menu of available and permitted user interactions with a first object in user definable relationship with a second object within a virtual environment, said method comprising;
constructing a list of a priori user interactions characteristic of said first object,
adapting said list of user interactions by a further list of optional interactions that characterize the user definable relationship between said first object and said second object.

The method preferably comprises displaying said menu to user.

According to a further aspect of the present invention, within a virtual environment, there is provided a virtual object having an associated menu of available interactions with other objects, said object having dynamically changeable states, said menu being changeable dynamically in accordance with changes of available interactions consequent upon said changes in state.

Preferably, said states are selected from appearance states, position states, and function states.

Preferably, said menu is displayable by locating a cursor over said virtual object.

In the context of this document, words such as solid, object, scene, environment and the like, refer to virtual solid, virtual object, virtual scene, virtual environment and the like, unless the context clearly implies otherwise.

For brevity, the term 'mouse' refers to any cursor-manipulating device, including but not necessarily restricted to a computer mouse, which is an input device for moving an object, often a cursor, on a computer visual display unit (VDU). The term mouse is used herein, reflecting the widespread usage of the computer mouse for this purpose, however in this context, the term mouse should be understood to also refer to other input devices, such as tracker balls, light-pens, keyboards, cursor arrows or other designated keyboard keys, joysticks, paddles or the object manipulation components of dedicated 3D immersion or virtual reality equipment.

Similarly, the term 'VDU' may refer to any display device, particular 2D computer monitors, such as liquid crystal displays (LCD), cathode ray tubes, image projectors and screen, and to any similar device. Likewise, the visual components of dedicated 3D immersion or virtual reality equipment are to be considered as within the ambience of this term.

Similarly, the term 'computer' is to be understood loosely, to include electronic devices for example, portable phones and TV sets, particularly when equipped for graphical, networked, interaction.

The present embodiments relate to objects in an object-oriented environment, thus the word object as used herein, refers to an individual, identifiable item, or programming unit, particularly to an autonomous programming element or entity, with a well-defined role in the problem domain, and to all the functions and code associated with a programming element, including characteristics such as the shape and form of the object as displayed on the computer monitor, its color, and associated properties such as sounds, functions and the like.

The embodiments disclosed herein are directed to user interaction with objects within scenes, within a virtual environment, particularly with the interaction of a plurality of users with a plurality of objects, within a virtual environment, and more particularly, where said plurality of users have different allowable interactions. In the preferred embodiments described herein, interactions with 3D objects in 3D scenes are described. (It will be appreciated by the reader, that many of the features described herein for 3D virtual reality, may be applied in other embodiments to flat shapes, 2D objects, scenes and the like, *mutatis mutandis*).

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing illustration of the conceptual aspects of the invention. In the accompanying drawings:

FIG. 7 is a functional block diagram of a prior art virtual object.

FIG. 8 is a functional block diagram of a virtual object with internal coordinate system.

FIG. 9 is a perspective view of a virtual chair, showing its bounding box and associated adapted Cartesian coordinate system.

DESCRIPTION OF THE PREFERRED EMBODIMENTS

Figure 1:
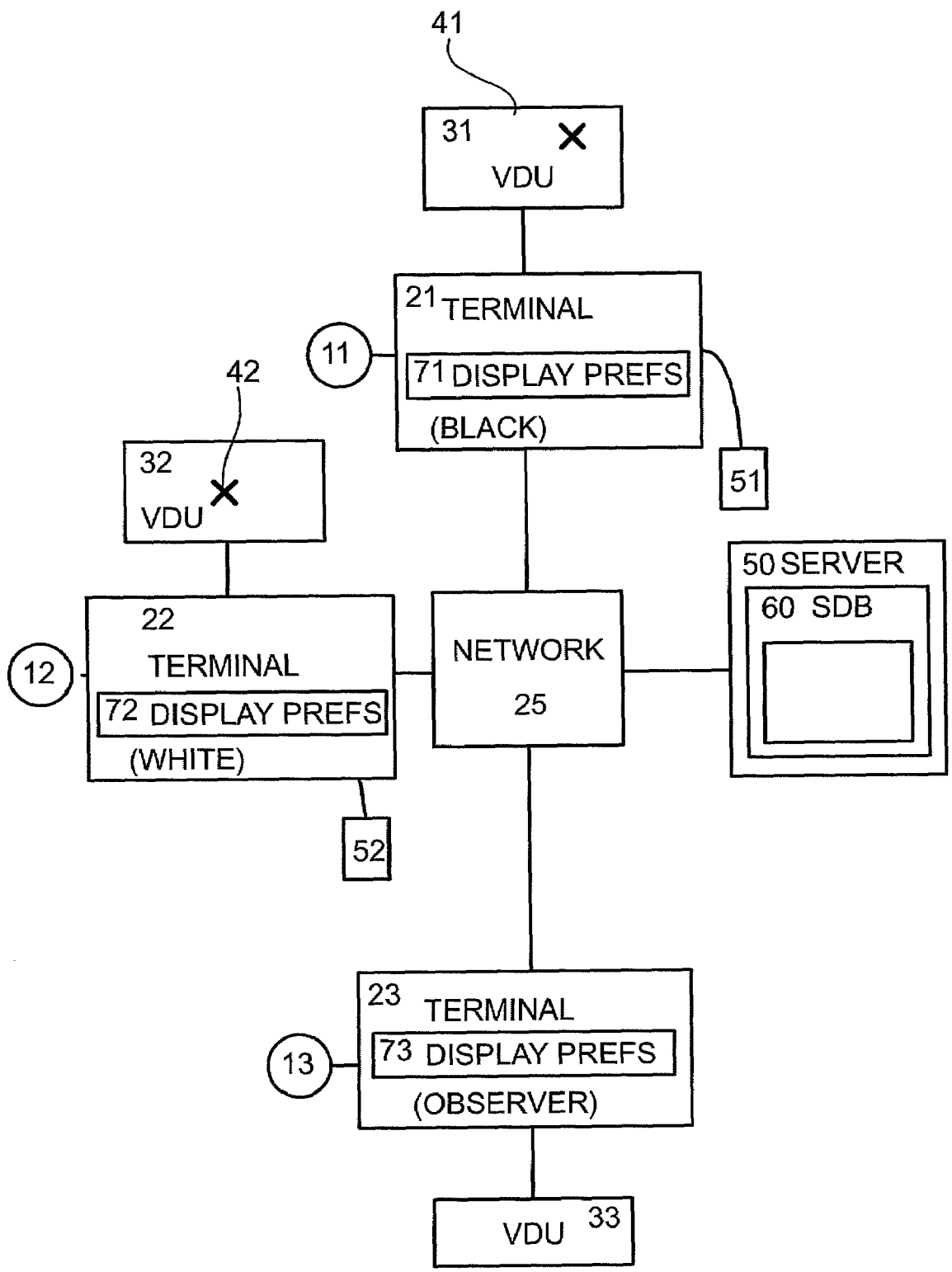
FIG. 1 shows schematically the inter-relationship between client and Host computers in networked computing.

Embodiments of the invention preferably provide a virtual environment for user interaction, and virtual objects for use therein, the virtual objects having an internal co-ordinate system with natural language definition to allow simplified inter-object relationships. The internal co-ordinate system is used to define docking positions for connecting to other objects to allow logical or natural positional relationships. A dynamically defined menu system allows pop-up menus for simple user entry of required relationships and/or tool tips to inform the user of relationships available. Further embodiments allow selection of objects or groups of objects using queries based on defined relationships or other features of the objects, for interaction or for defining of new relationships.

Before explaining the embodiments of the invention in detail, it is to be understood that the invention is not limited in its application to the details of construction and the arrangement of the components set forth in the following description, or illustrated in the drawings. The invention is applicable to other embodiments or of being practiced or carried out in various ways. Also, it is to be understood that the phraseology and terminology employed herein is for the purpose of description and should not be regarded as limiting.

Throughout this description, reference is made to different coordinate systems. The co-ordinate systems may be Cartesian, polar, spherical, cylindrical tetragonal, hexagonal, or any other 3D co-ordinate system as discussed above. The co-ordinate systems as referred to hereinbelow are now defined.

A server coordinate system is any kind of 3D coordinate system that enables objects in the 3D environment to be located therein, in the Cartesian case with respect to orthogonal axes X, Y and Z.

A client coordinate system is a coordinate system wherein the same 3D environment is described relative to the client viewpoint, such that, for example in the Cartesian case, orthogonal axes are defined as being within X', Y' or perpendicular to Z' the VDU of the client. Thus the client coordinate system is generally the same as the server coordinate system.

An object coordinate system is a coordinate system where positions are defined relative to an origin that is a pre-selected point associated with the object, and having a relative position therewith that remains constant. The object coordinate system may for example be a Cartesian coordinate system having orthogonal axes, xyz, which may be defined with respect to the pre-selected point thereof, and may use natural language relative positioning terms such as left, right, up, down, forwards and backwards, to identify locations with respect to the pre-selected point. Alternatively, polar coordinates may be used to define positions in virtual space with respect to the pre-selected point associated with the object. Alternatively, any other 3D co-ordinate system may be used.

It is to be noted that in as far as the embodiments are applicable to four and higher dimensional scenes, the co-ordinate systems to be used are preferably co-ordinate system of the selected higher dimension.

With reference now to FIG. 1, which is a simplified block diagram illustrating networked computing, a plurality of users 11, 12, 13 are shown at client terminals 21, 22, 23 each connected to or 'logged on to' a single server 50 via a network 25. The server 50 includes a Scene Database SDB 60. The plurality of client terminals 21, 22, 23 each has a screen 31, 32, 33 and display preferences 71, 72, 73 and input devices 51, 52, 53 respectively. FIG. 1, will be referred to further on, with respect to a game of virtual chess played between Black 11, White 12, and an Observer 13.

Networked computing comprises a plurality of remote terminals or 'clients' 21, 22, 23 interacting with the same computer application, the bulk of which usually runs on a host computer such as the server 50. The clients 21, 22, 23 and the server 50 are interconnected via a Network 25. The individual clients 21, 22, 23 are often at a considerable distance from each other and from the host server 50 on which the bulk of the application programming code is stored.

An interaction made by a first user 11 interfacing with a first client terminal 21 is coded at the first client terminal 21, and transmitted to the server 50. The server sends data to all logged on clients 21, 22, 23, updating them regarding the said interaction. The networked server 50 and clients 21, 22, 23 provide a computing environment or virtual medium for such interactions.

Preferred embodiments of the present invention enable a plurality of users, often a very large number, which may even be thousands of clients in real-time, to interact over a single interactive environment. The embodiments are preferably designed for networked computing environments, particularly very large, open networked environments such as the Internet.

Preferred embodiments not only may comprise very many clients, but may also, particularly comprise a plurality of servers, or alternatively, a server that is itself distributed over a number of host computers on different nodes of the network.

The environment optionally comprises sophisticated, non-static, 3D scenes, optionally having detailed 3D background, which may be viewable from different vantage points, and optionally contains a limited, discrete number of objects selected from an almost infinite set of objects, that, because of the dynamic nature of some applications, may not even have been conceived by the original designer of a particular application.

Figure 2:
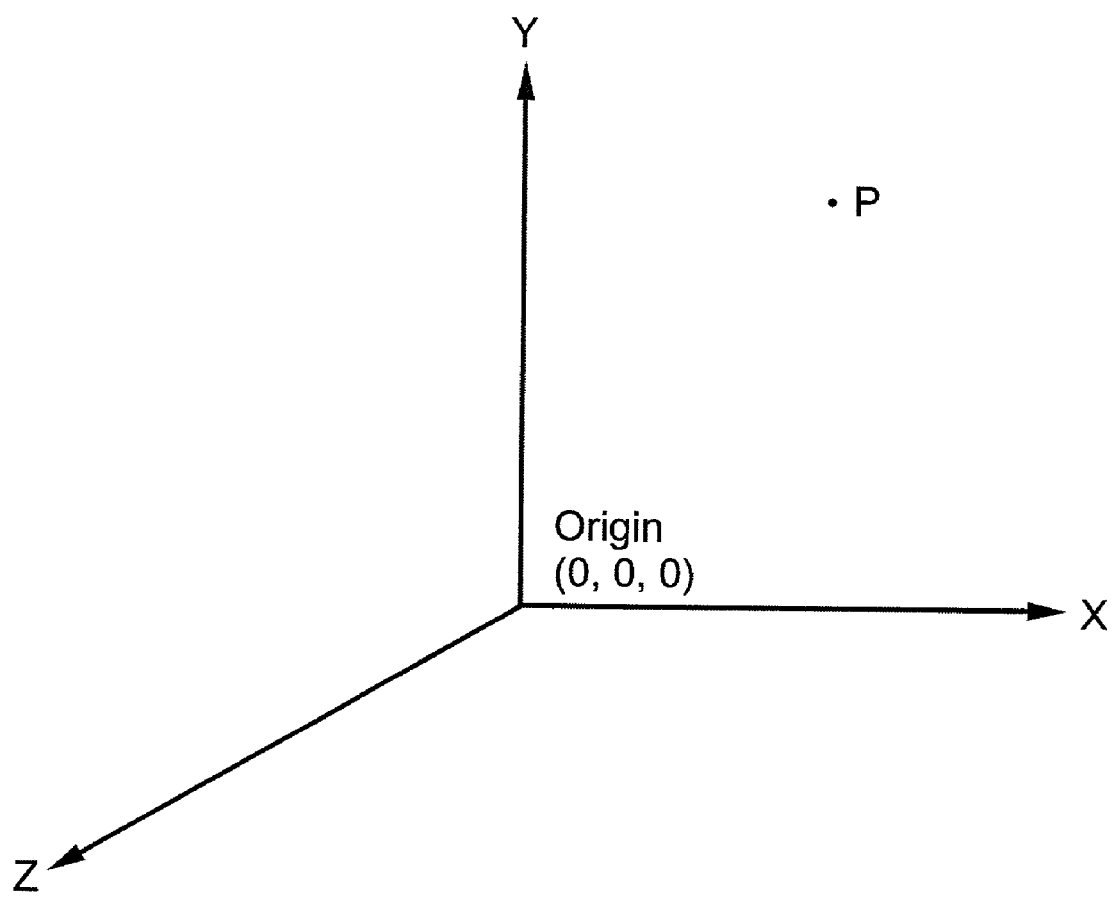
FIG. 2 shows a set of three orthogonal axes defining 3D Cartesian space.

Reference is now made to FIG. 2; which shows a point P in three-dimensional XYZ space, projected onto a two-dimensional XY plane. Two axes, the x-axis X and the y-axis Y can be drawn in the plane of the paper or screen. The third axis Z, representing the direction perpendicular to the plane of the paper or screen, can be indicated at an angle. However there remains some ambiguity, as to the exact coordinates, or position of a point P shown within the XYZ space.

Figure 3:
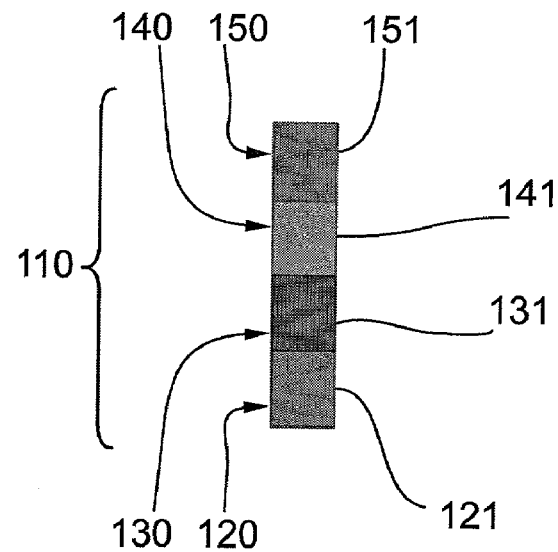
FIG. 3 shows in front perspective view, a staggered stack of bricks.
Figure 4:
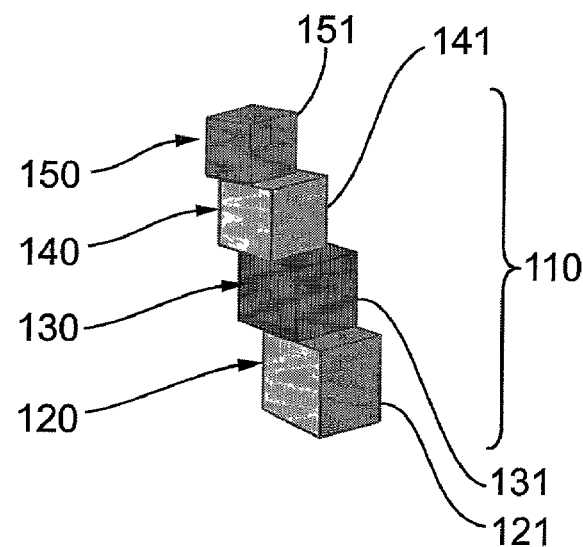
FIG. 4 shows a perspective view of the staggered stack of bricks shown in FIG. 3, from a second viewpoint located about 30° clockwise of the front viewpoint.

Reference is now made to FIGS. 3 and 4, showing a stack 110 of blocks 120, 130, 140, 150 from different viewing angles. FIG. 3, shows a stack of blocks 110 as viewed from the front. A user viewing a plurality of blocks 110 from the viewpoint described, could use a mouse to click and drag blocks 120, 130, 140, 150, to pick them up and place them down forming what appears to be a well-stacked pile such that faces 122, 132, 142 and 152 appear to be vertically aligned. From a different viewpoint, a few degrees in a clockwise direction, the stack of bricks shown in FIG. 3, appears as that illustrated in FIG. 4, showing that the bricks are not correctly stacked, as the user intended. Since face 132 of block 130 is not vertically aligned with face 122 of block 120, but rather is displaced backwards, block 130 and block 120 are thus misaligned. In consequence, as additional blocks 140 and 150 are added to the stack 110, the stack 110 appears increasingly unstable. This simplified embodiment illustrates the difficulties in viewing a 3D scene and particularly with navigating and positioning 3D objects in a virtual 3D scene, when viewing said scene on a 2D monitor.

Figure 5:
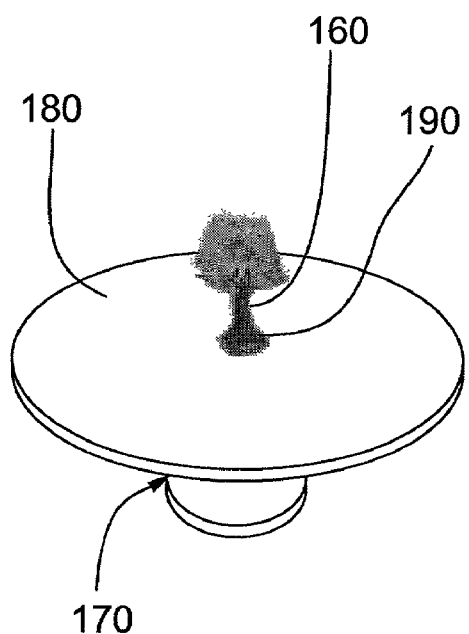
FIG. 5 is a perspective view from an above-forward vantage point, of a virtual lamp, apparently resting on a virtual tabletop.
Figure 6:
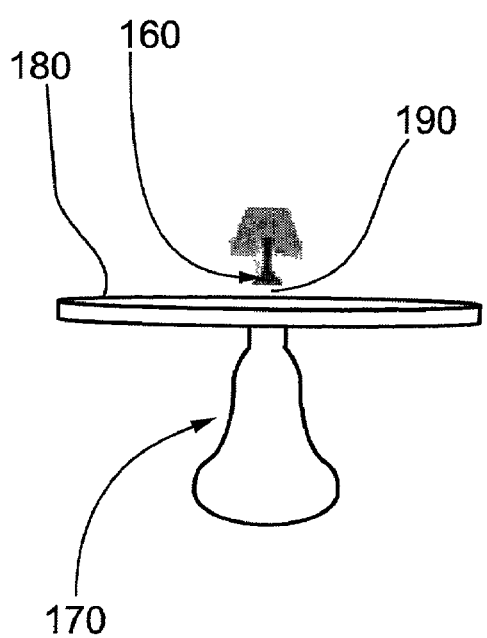
FIG. 6 is the view of FIG. 5, taken from a different perspective, showing that the lamp is actually levitating above the tabletop.

Reference is now made to FIGS. 5 and 6, which show a table lamp 160 separated by a gap 190 from a tabletop 180 of a table 170, and provide a further illustration of the type of difficulties encountered. In FIG. 5, the lamp 160 appears to rest on the table 170, the said lamp 160 appearing to be centrally positioned, and resting on the tabletop 180. In FIG. 6 however, showing the same view from a vantage point at tabletop height, the lamp 160 is revealed to be 'floating' in a non-logical position above the tabletop 180, separated from the tabletop 180 by a gap 190.

It is to overcome problems of this nature to which the present invention is addressed.

Reference is now made to FIG. 7, which is a functional block diagram showing how a typical prior art virtual object 800 comprises visible appearance elements 810, a centroid 815, a bounding box 820, function and behavioral aspects 830 and an absolute position XYZ 840. The bounding box 820 has height 822, width 824 and depth 826.

Internal Co-ordinate System

The position of Prior art virtual objects within a virtual reality environment is in terms of an absolute position 840 that is, an absolute position of a pre-selected point, such as the centroid 815 thereof, defined in absolute terms, relative to the coordinate system of the virtual space, or the server coordinate system XYZ.

Reference is now made to FIG. 8, which is a functional block diagram of the first aspect, showing how a virtual object 900 with internal coordinate system, in addition to typically comprising visible appearance elements 910, a pre-selected point 915, a bounding box 920, function and behavioral aspects 830 and an absolute position XYZ, further comprises a relative positioning mechanism 950. This feature is typically an internal coordinate system that allows other objects to be relatively positioned with respect to this virtual object 900.

A generalized embodiment comprises the virtual object 900 having an associated coordinate system. The virtual object associated coordinate system 950 is a coordinate system for describing locations in the virtual environment, relative to the position of a pre-selected point 915 that is associated with the object and has a constant position with respect to the object, and is preferably a point within the boundary box, such as the centroid thereof. The pre-selected point acts as an origin for the virtual object associated coordinate system 950, which may be a Cartesian coordinate system having orthogonal axes, xyz that are defined with respect to the position of the pre-selected point thereof 915. Alternatively, polar or other appropriate coordinates may be used to define locations in the virtual environment, relative to the position of the pre-selected point 915.

Natural Language Positioning

In a more specific embodiment however, an adapted Cartesian coordinate system is used for describing locations in the virtual environment, relative to the position of the pre-selected point 915 of the object 900. The specific embodiment for the virtual object associated coordinate system 950, allows locations to be described using words such as up, down, left, right, forwards and backwards to indicate the opposite directions along the three axes, wherein the orientation of the axes is fixed with respect to the directions of the bounding box 920 dimensions of height 922, width 924 and depth 926, and preferably parallel with them. The basic unit of length in the up-down direction, along the up-down axis is the height of the bounding box. Likewise, the basic unit of length in the forwards-backwards direction, along the forwards-backwards axis is the depth of the bounding box. Likewise, the basic unit of length in the left-right direction, along the left-right axis is the width of the bounding box. Expressing distances and direction in terms of the size and orientation of the bounding box from a pre-selected point associated therewith, provides a natural language for identifying locations in virtual space with respect to the bounding box, as is described below.

Reference is now made to FIG. 9 showing a chair 650 considered as a virtual object with an associated adapted Cartesian coordinate system 900 (see FIG. 8), showing the associated adapted Cartesian coordinate system 950, and showing the bounding box 610 having the three dimensions; height 630, width 620, and depth 640; the internal coordinate system 950 having the directions upwards 951, downwards 952, leftwards 953, rightwards 954, forwards 955 and backwards 956.

When defining a virtual object with internal adapted Cartesian coordinate system 900, in addition to the typical features of which Prior art objects are comprised, a front face and orientation is defined 960. By virtue of the front face thereof 960, the six directions; upwards 951, downwards 952, leftwards 953, rightwards 954, forwards 955 and backwards may be defined with respect to the object. The orientation of the bounding box 610 is also defined such that the height 630, width 620, and depth 640 thereof are aligned with the six aforementioned directions.

By constructing an object as a virtual object 900 having an associated relative positioning mechanism 950, the positions xyz of locations within the virtual space, other objects within the virtual environment, and docking positions (to be described below), can be described relative to the position of the virtual object. This is in contrast with Prior art virtual objects 800, lacking an associated relative positioning mechanism 950, wherewith the position thereof, and the position of locations within the virtual space, other objects within the virtual environment, and docking positions, are defined in absolute terms, with respect to the server coordinate system XYZ.

Figure 10A:
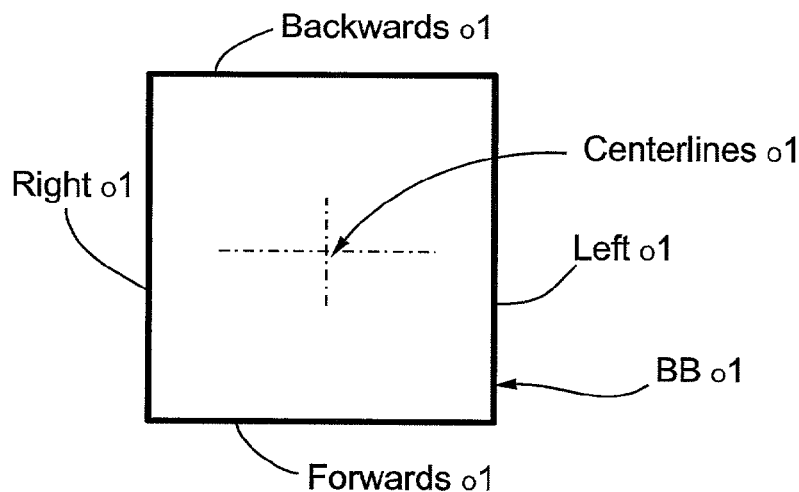
FIG. 10 is a plane view of the bounding boxes of virtual reality objects.
Figure 10B:
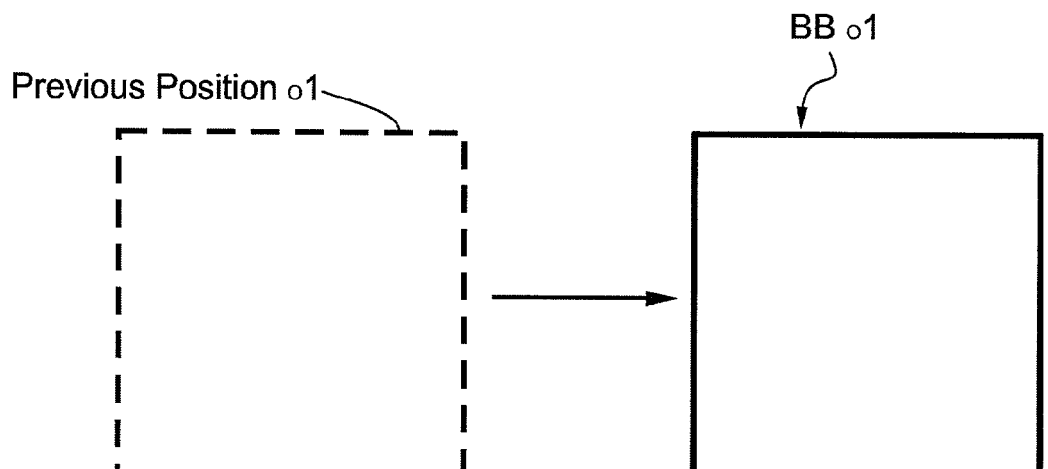
Figure 10C:
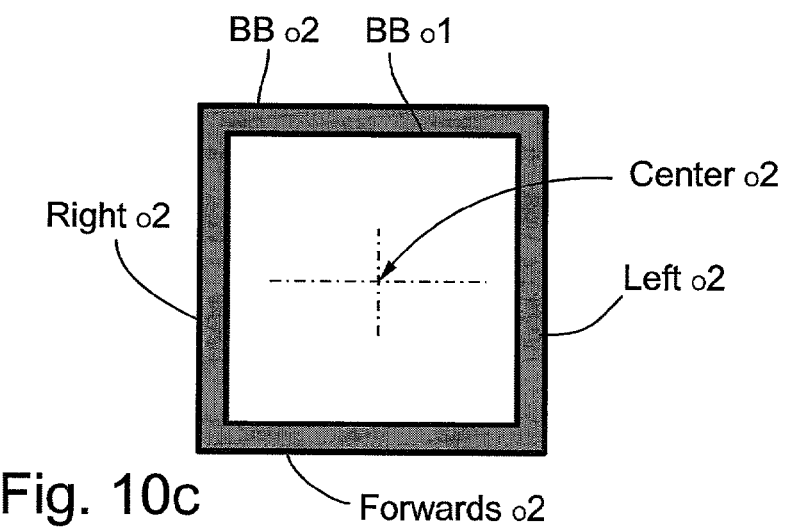

The relative positioning mechanism may be accomplished by applying an internal coordinate system to an object, and to illustrate how positions may be defined with respect to an internal coordinate system, reference is now made to FIGS. 10(a) to (c), showing a plan view of the bounding box BBO1 of a first object o1, the bounding box BBo2 of a second object o2. The borders Lefto1, Righto1, Forwardso1, Backwardso1, and the centerlineso1 are shown for the first object, and the borders Lefto2, Righto2, Forwardso2, Backwardso2, and the centerlineso2 are shown for the second object.

Referring specifically to FIG. 10(a), a first object o1, regardless of shape and size, can be enclosed in a bounding box BBo1, which, from above, may be represented as a rectangle, having borders Lefto1, Righto1, Forwardso1, Backwardso1, and centerlines centerlineso1. Such a first object o1 can be positioned in a position Po1 defined with respect to a Reference position RP, which may be the present position of the first object o1, or the position of a second object o2. The directions of movement will be in terms of the orthogonal axes of the boundary box; Lefto2–Righto2, Forwardso2–Backwardso2 and upo2–downo2 (not shown), and the unit of distance in each direction, will be the length of the boundary box in that direction.

The directions shown on FIG. 9 can be used as natural language syntax for defining positions associated with the object, taking outwards as being the positive direction, and inwards as being the negative direction. This is a way of constructing an appropriate syntax for describing the positioning of objects, which with appropriate modification, may be used with any coordinate system, and along any axis. In this manner po1<Left+3>po2 would mean: position object 1, three object widths away from the left side of the bounding box of object 2, in an outwards direction (with respect to object 2). Similarly po1<up-2>po1 would mean: position object 1, two object heights away from the upper bounding box of object 1 in an inwards direction (which is, of course, equivalent to one object height below the lower side of the object, or po1<down+1>po1). Thus the position of a first object, Po1, can be defined with respect to a reference position, RP, using distances therefrom, along the Left–Right, Forwards–Backwards and up–down axes, where the unit distance along each axis may be the length of the bounding box dimension parallel to that axis, so a simple positioning command syntax may be used, so Po1<Lefto2–Righto2, Forwardso2–Backwardso2 and upo2–downo2>RP.

The above syntax may be used in programming the scene and it may also be made available to a user to enable dynamic interaction with the scene at run time. Thus the user can position an object by using the above syntax, in a manner which is unambiguous in 3D space, even though the user may be viewing the scene through a 2D screen.

Reference is now made to FIG. 10(b), which shows a previous position of a first object o1, the new position thereof, and a second object whose position does not change. A first object o1 can be repositioned in terms of its previous position. Thus moving o1 a distance of one object width, to the left of a pre-selected position associated therewith, such as the left side Lefto1 of the boundary box BBo1 thereof, may be implemented using the following positioning command syntax:

Po1<Lefto1+1, center, center>Po1

Reference is now made to FIG. 10(c), which shows a new position of a first object o1, now centered on a second object o2 (shaded). A first object o1 can be moved to a new position with respect to a second object. Specifically illustrated, a first object may be repositioned at a new position, centered on a second object o2. The positioning command syntax in this case would be:

Po1<center, center, center>Po2

Thus, the new position of an object may be defined with respect to the previous position thereof as shown in FIG. 10(b), or it may be defined with respect to the position of another object as shown in FIG. 10(c). In both cases, the positioning may be described in terms of the bounding box dimension unit lengths in the directions parallel to the bounding box dimensions. Since fractional multiples of the bounding box dimension lengths are allowed, such as 1.5 widths or −3.2 heights, and positions can be located in terms of both positive and negative movements along any combination of axes, every point in space around the pre-selected point associated with the object may be identified. Further, positions may be made with respect to any pre-selected point associated with the object, but particularly, the borderlines of the bounding box, the centroid, and the centerlines of the bounding faces of the bounding box, have been found to be convenient positions to use, and the positioning command syntax may be so constructed to facilitate use of these points. For purposes of illustration in the aforementioned examples, rectangular bounding boxes were described. It will be appreciated, that for certain objects and coordinate system types, other shapes of bounding boxes may be appropriate, and a corresponding, appropriate syntax may be devised.

Selection of objects for positioning may be carried out explicitly or it may be carried out logically. Logical selection is carried out using a logical query, for example by selecting all objects that are red. Thus for example it is possible using selection and natural language interaction to select and stack all red tables.

The natural language feature described above can be used to define how the results of a query are to be presented. For example a query can ask for all red tables to be presented and stacked in a given corner.

Finally, objects typically occupy only a portion of the area (or volume) within their bounding shape. Precise collision detection, that is collision detection involving the edge of the object as opposed to the edge of the bounding shape, can be used to allow objects to fit together in a natural way even when the fit requires superposition of bounding shapes. For example a chair is able to slide underneath a table even though the underneath of the table is within the table's bounding box, and may continue to slide until the back of the chair meets the edge of the table, which event is detected by the precise collision detection. Conventional collision detection determines only when the bounding shapes meet. Once the bounding shapes have met, conventional collision detection plays no further part.

Docking

Preferred positions or docking positions may be established on a first object or associated therewith, for locating second objects thereat. Such preferred positions may be relative positions with respect to the first object, whose locations are defined using the associated relative positioning mechanism of the first object. These docking locations may be established as anchor points, where an anchor point is a default location for locating of other objects thereat. Thus, another object that is dragged-and-dropped to the vicinity of such an anchor position, may snap into the anchor position, and associate itself with the first object. Alternatively the other object may be selected, and then the user is offered the possibility of establishing a positional relationship with the first object. Upon selecting the first object, the other object automatically docks at the docking position or anchor position of the first object.

Such docking or anchor positions may be of a general nature, accepting any type of other object, or may be adapted to certain types of other objects, in which case, the specialized anchor point might be considered as being a docking position for the specified certain types of second objects. Thus using anchor points and docking positions enables secondary objects to associate with first objects and to display logically. The term 'logically' as used herein, means in accordance with the internal logic of the application. This is often a reflection of real-world logic, when the virtual environment is designed to reflect real world behavior, but need not be limited in this way, and for some applications, such as fantasy games, the logic may be very different.

Placement of an object into a docking position may be achieved by interaction therewith, using a mouse for example.

Unambiguous 3D Object Positioning

In more general terms, objects in a 3D environment require positioning in an unambiguous manner. An embodiment, described below, describes four preferred features for permitted object positioning. The first feature will be referred to herein as 'Functional Structuring for Networked Applications', the second feature will be referred to herein as 'Object Positioning', the third feature will be referred to herein as 'Permissioning', and the fourth feature will be referred to herein as the 'Pop-up Tool-tip Menu'.

These features may be applied both to conventional virtual objects, and to virtual objects with internal coordinate systems as described above.

Functional Structuring

The first feature, 'Functional Structuring for Networked Applications', is a means of facilitating interaction with, and/or viewing of, a scene in a virtual reality application, in a networked computer environment, by a plurality of remote users, such that all remote user terminals are updated of changes to the scene, originating with any particular user or with the host, in real time, substantially avoiding time lags. To achieve a real-time, rapidly updated display of a scene, the amount of data that travels to and from each individual user terminal is preferably minimized. This is achieved by functionally structuring the programming code of the application into multi-element objects, such that certain elements are computed on the remote terminals, particularly those elements relating to user viewing options and interaction, whereas certain elements, such as allowable interactions, and elements relating to background and other features of a general nature, applicable to all interacting users, are computed on the host computer. (Depending on the nature and/or complexity of the application, there may be more than one host computer, each of which may handle different features of the application). Thus Functional Structuring for Networked Applications may be used in an architecture for computer applications programming.

Both the players 11 and 12 and the observer 13 have freedom to change their display preferences 71, 72, 73, such as viewpoints and/or other display options at their terminals 21, 22, 23. However these display preferences 71, 72, 73 only affect the way the scene is displayed on their terminal screens 31, 32, 33, and neither the server 50 running the SDB 60, nor other users are aware of what any particular user, observer or player does in this respect.

A desirable feature of 3D scenes is persistency, which is to say that a part of a scene that is temporarily out of view to the users retains its state at the time it was left so that when the users return it is in the same state in which it was left.

Referring again to FIG. 1, The portions of the program that are common to all users are stored in the Scene Database (SDB) 60, which is stored and run on the server 50. Functions such as the display preferences of individual users 11, 12, 13 are stored on the clients 21, 22, 23 of those individual users 11, 12, 13. If a first user 11 makes an interaction, such as a movement of a screen object 41 on his/her screen 31 using a mouse 51, the said movement is coded by the client terminal 21 of the first user 11, compressed where appropriate, and transmitted via the network 25 to the SDB 60 on the server 50. The SDB 60 transmits these signals to all logged on clients 21, 22, 23 where the change in position of the aforementioned screen object 41 may be displayed on their screens 31, 32, and 33.

Figure 11:
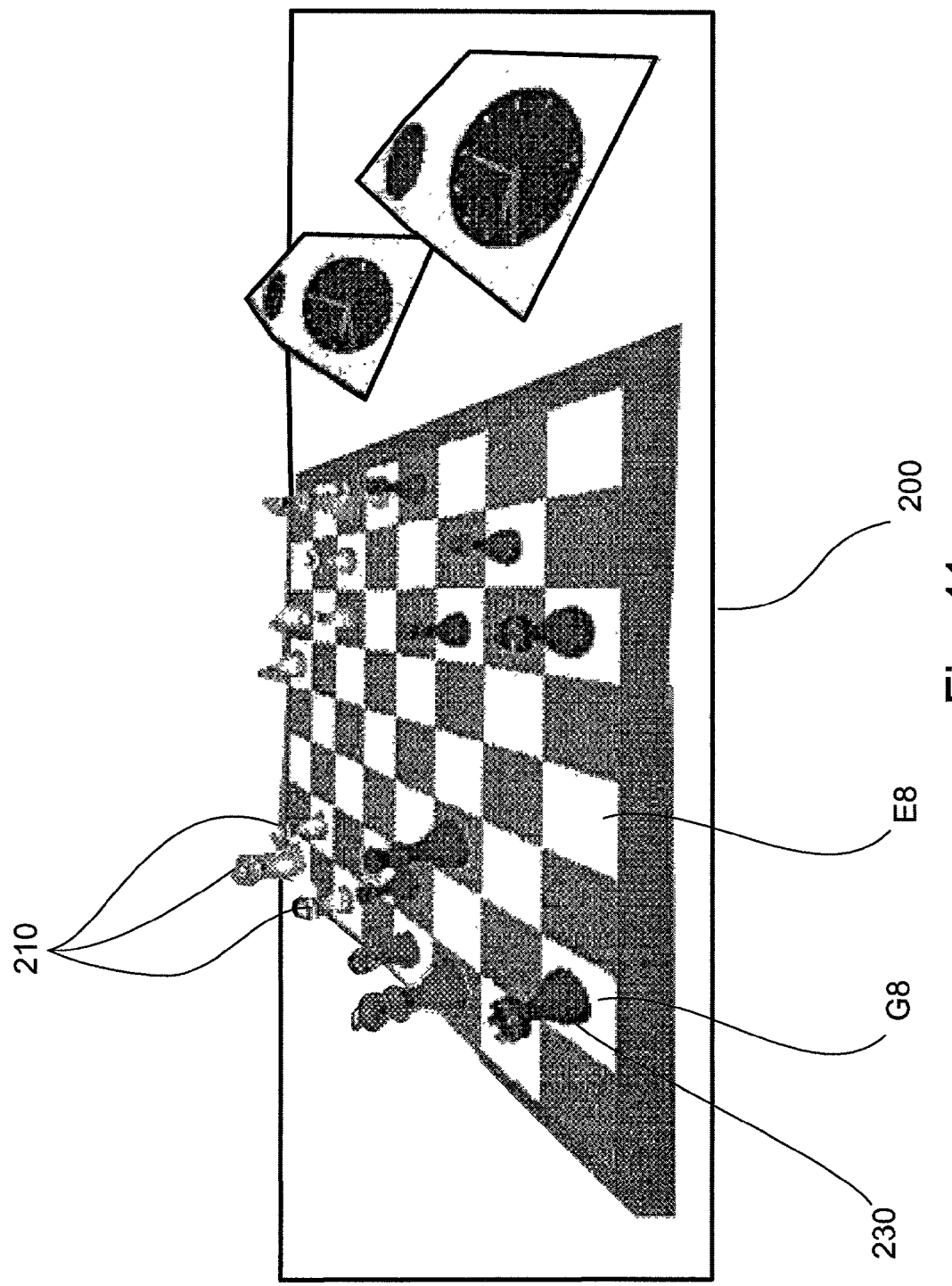
FIG. 11 shows a virtual chessboard and chessmen.

Reference is now made to FIG. 11 which shows a virtual reality chess-match comprising a chessboard 200, having 64 squares arranged in an 8×8 grid, and featuring various chessmen 210. Particular attention is drawn to a Black rook 220, and to G8, the current position of a Black rook 220, and to D8, another square on the board.

To illustrate this first feature and the further features of the present embodiment, a game of chess, played between two remote end users, Black 11 and White 12 and observed by an Observer 13 is considered. (There may, of course be, a plurality of Observers).

Such a chess-game is illustrated in FIG. 11. Referring to FIGS. 1 and 11, clearly, how a particular end user 11, 12, 13, (whether that user is one of the players 11 or 12, or an observer 13) chooses to display the game, has no effect on the game itself. Thus each user 11, 12, 13 may choose from a variety of display options, including different colors for the chessmen 210 and/or the chessboard 200, different styles of chessmen 210 (chosen from various alternatives, such as the Staunton style which is Internationally accepted as the standard design for tournaments, as shown in FIG. 11, or the historical Lewis chess set, or an animated set, or a political satirical set). Likewise, each user 11, 12, 13 may select a different viewing angle. Since it does not affect the game if a user, whether an Observer 13 or a player 11 or 12, changes the display color option for white pieces 210, chooses to view the board 200 from a different viewpoint, or otherwise changes his/her display, there is no need to transmit this information to the server 50, in order to update the SDB 60. Features of this type are thus preferentially situated on the user's own terminal, i.e. the relevant client, 21, 22 or 23. The rules of chess however, the current position of the pieces, whose turn it is, and elapsed time per player are features that should be known to all players and observers, and need to be accessible to all users. These features are therefore preferably provided as part of the SDB 60, which is preferably stored on the server 50.

The advantage of structuring a multi-user application in this manner is now readily apparent. Despite having virtual-reality graphics, and each user having a wide choice of display options such as the chess set played with, the color of the pieces and board, and despite the near-infinite number of possible positions for the chessmen and the need to ensure that the rules of the game are stringently adhered to, both players' 11, 12 clients 21, 22 can communicate with the SDB 60 and thus with each other, by merely transmitting and receiving moves played, which can be done by referring to the moved-from and moved-to square, as is done in correspondence chess! Thus Black 11 moves his/her rook 220 from G8 to E8.

The concept of only transmitting movements and change can be used for other games, and also for non-gaming applications. Any move of any object displayed on the screen can be performed by dragging and dropping with the mouse. By using a coordinate system to divide up the scene space, such moves can be transmitted between terminals in real time. Where a scene contains a limited number of objects against a static background, the objects can be moved by reference to a coordinate system, and only the part of the scene that changes need be redrawn at the various remote terminals. If a new object is inserted into a scene by a particular user, or by the main program running on the host, the new object, including its form and all associated functions, is required to be transmitted to all users and to the host but once. From then on, changes in position to be transmitted to all end users only require the transmission of 'before–after' coordinates in three dimensional space, or 'object name—new position' data. Any user can download any scene at any time, together with a current state of play, and then follow the interactions, or make interactions where appropriate, by transmitting only minimal information.

Object Positioning.

A second feature of the first embodiment relates to the relative positioning of different objects within a scene. This feature is referred to herein as 'object positioning'.

An 'object' in this context, refers to the visual representation of any physical object that is moveable, and is displayed within a scene.

The object being moved and positioned with respect to other objects is referred to herein, as the primary object. Other, stationary objects are referred to, herein, as secondary objects.

Logical positioning refers to the exact position and orientation of a primary object in virtual space, within a virtual environment, particularly with respect to a secondary object or a plurality thereof, such that the primary object appears correctly from all vantage points. By 'correctly', in accordance with the specific logic of the virtual environment is intended. Thus where a virtual environment simulates the physical world, 'logically' would mean in accordance with the rules of gravity for example.

Figure 12:
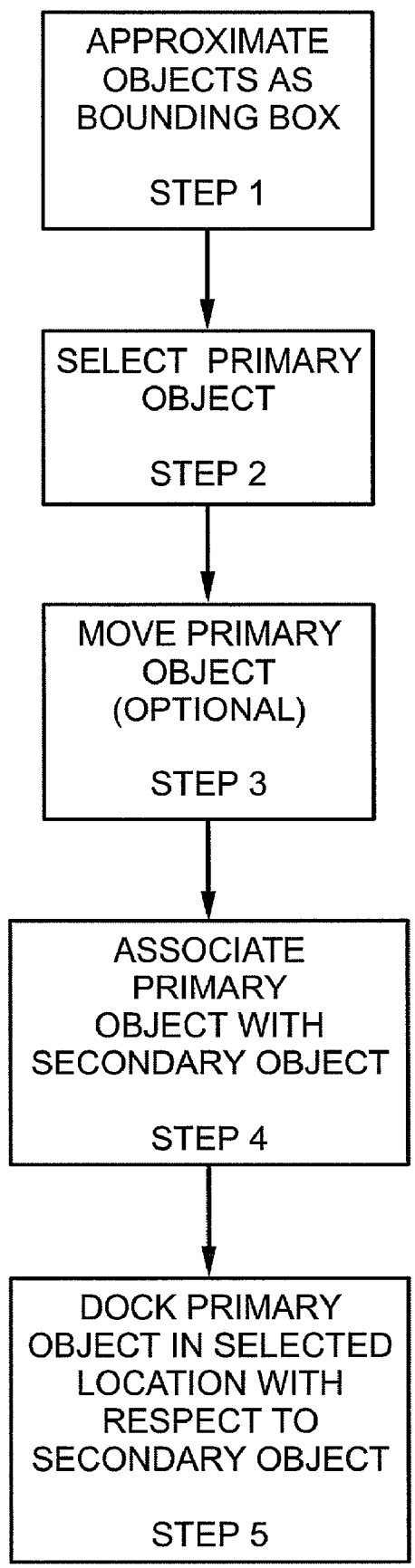
FIG. 12 shows schematically how a first object is selected, moved and positioned with respect to a second object.

FIG. 12 shows schematically the five steps required to correctly position and optionally dock a primary object with respect to a secondary object.

Positioning refers to the placing of an object at a position in the 3D space, possibly using language as described above. Docking refers to the snapping of the object into a position designated on the primary object.

By way of introduction, objects are generally approximated in 3D environments by their boundary shapes, for example as rectangular blocks having height, width and depth, or alternatively as spheres, cylinders, octagonal prisms and the like. The following example uses rectangular bounding boxes, and the skilled person will be able to extend the example to other bounding shapes. The dimensions define bounding boxes representing the outer limits of the objects. The height, width and depth of each object are defined in terms of the dimensions of the bounding box thereof.

The use of bounding shapes for interactions gives rise to certain difficulties in the 3D environment such as objects floating on top of other objects. Furthermore simulations involving collision detection may suffer from lack of accuracy if the simulation is based on a collision between bounding boxes rather than on the collision between the objects themselves.

With reference now to FIG. 12, positioning comprises steps one to four of the following series of steps, and docking is an optional fifth step.

STEP 1: Primary and secondary objects are firstly approximated in 3D environments by their boundary shapes, as described above.

STEP 2: A primary object is typically selected by manipulation of the cursor.

STEP 3: Once selected, the primary object may either be moved in integral or non-integral multiples of its own dimensions, along axes determined by the vantage point of the user, such that height and width are defined in terms of the direction of the plane of the VDU screen, and depth is determined in terms of the directions orthogonal to the plane of the VDU screen. The movement may be carried using natural language instructions in terms of the dimensions of the object as described above.

STEP 4: If the object that has been moved is placed near to a secondary object, the program decides, for example from limitations of the application, whether the primary object should be associated with the secondary object.

Step 5: Docking. Optionally, the closest docking position on the secondary object from the logically allowable docking positions is selected. This may be on, under or alongside the secondary object.

For purposes of illustration, the above moving of an object from its original position to its new position, docked onto a preferred point that has a relative location with respect to a secondary object, was achieved by selecting and dragging. This relocation can be performed merely by selecting with a mouse or equivalent, and then selecting a new position, again using the mouse, as is often done in the prior art. In this case, once a first object is selected by a mouse click, a further mouse click in the vicinity of a second object may result in the display on the screen perhaps as a tooltip, perhaps in a pop-up menu, of available alternative docking positions for selection by the user.

Figure 13:
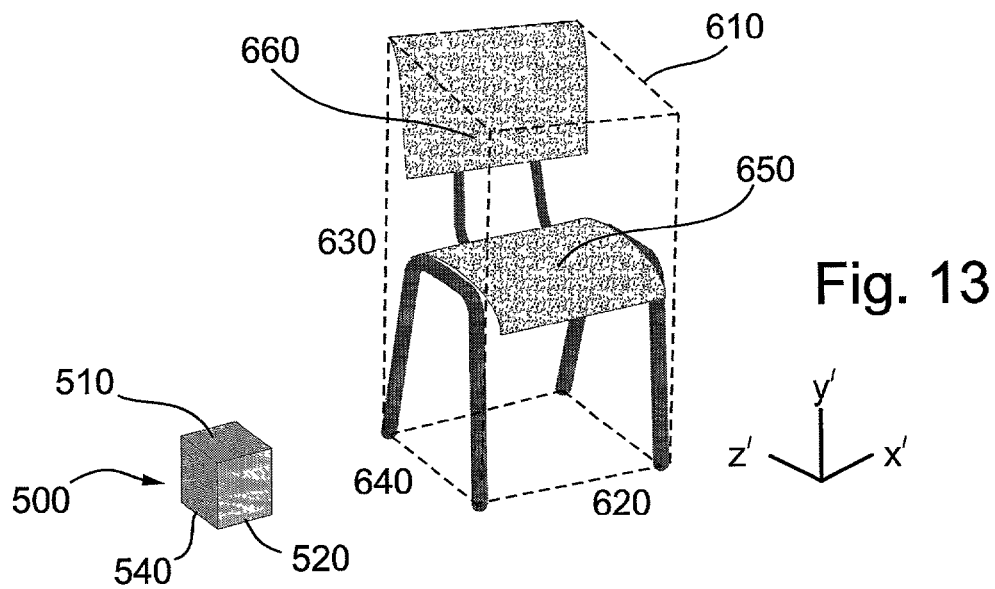
FIG. 13 shows a perspective view of a chair and cube showing bounding boxes.
Figure 14:
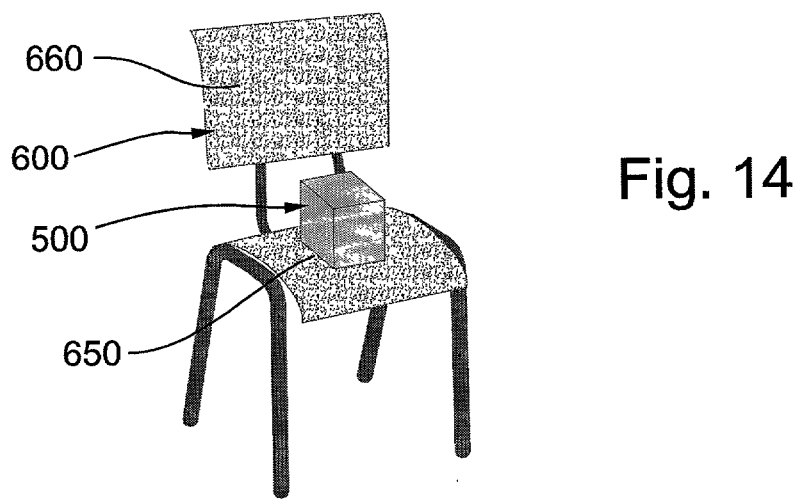
FIG. 14 shows a correct image of a cube meaningfully located on the seat of a chair.
Figure 15:
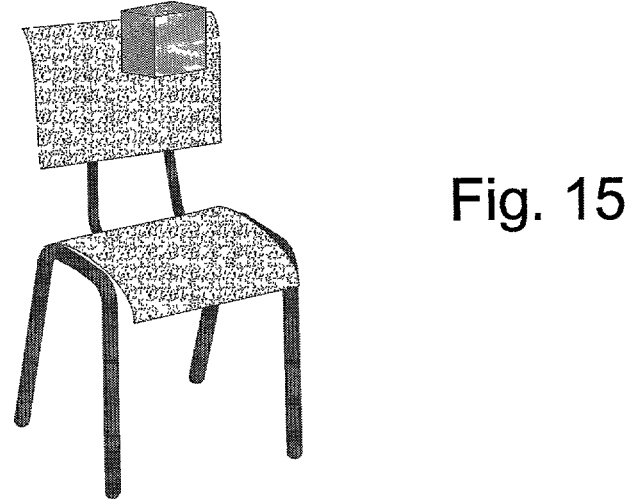
FIG. 15 shows a cube on a chair, such that the cube appears to be floating above the chair.

FIGS. 13 to 15 show a simple two-object scene containing a cube 500 and a chair 600. The chair has a seat 650 and a back 660, and both cube 500 and chair 600 are contained by bounding boxes 510 and 610, having width (w'), height (h'), and depth (d'), that is 520, 530, 540 and 620, 630, 640 for the cube 500 and chair 600 respectively.

As an example, reference is now made to the steps of FIG. 12 and to FIGS. 13 to 15. The user, seeing the image shown in FIG. 13, wishes to pick up the cube 500, and move it from its present position on the floor to the left of the chair 600, to a new position on the seat 650 of the chair. The cube 500 and chair 600 are shown, after the desired repositioning, in their new positions, in FIG. 14.

STEP 1, as shown in FIG. 13: The cube 500 and chair 600 are considered as being bound by bounding boxes 510 and 610 respectively. Each boundary box 510, 610 is defined by three dimensions width (w'), height (h'), and depth (d'), that is 520, 530, 540 and 620, 630, 640 for the cube and chair respectively.

STEP 2: The cube 500 is selected in the usual manner, for example by manipulating the cursor via the mouse.

STEP 3: Having been selected in Step 2, the cube 500 becomes the primary object. The cube may now be positioned using natural language processing as described above.

STEP 4: When a position above chair 600 is selected, the chair becomes the secondary object, and the cube is associated with it. The cube is now relocated to the position defined by the natural language.

Optionally, a further step of docking is carried out. The boundary box 510, now relocated adjacent to the boundary box 610 of the chair 600, is docked onto the upper horizontal surface of the chair, which surface comprises a natural docking position and which has thus been defined as a docking position for the chair. Thus, the cube 500 is redrawn to be displayed resting on the seat 650 of the chair 600, see FIG. 14.

Again, the relocation can be made straight to the docking point, by clicking on the cube to select it, and then clicking over the chair to relocate. If the chair has a single docking point associated therewith, the cube will dock by default in that docking point.

An alternative to using a predefined docking position is to use precise collision detection as discussed above, to determine when the object has reached the seat of the chair and to stop it at that point.

Figure 16:
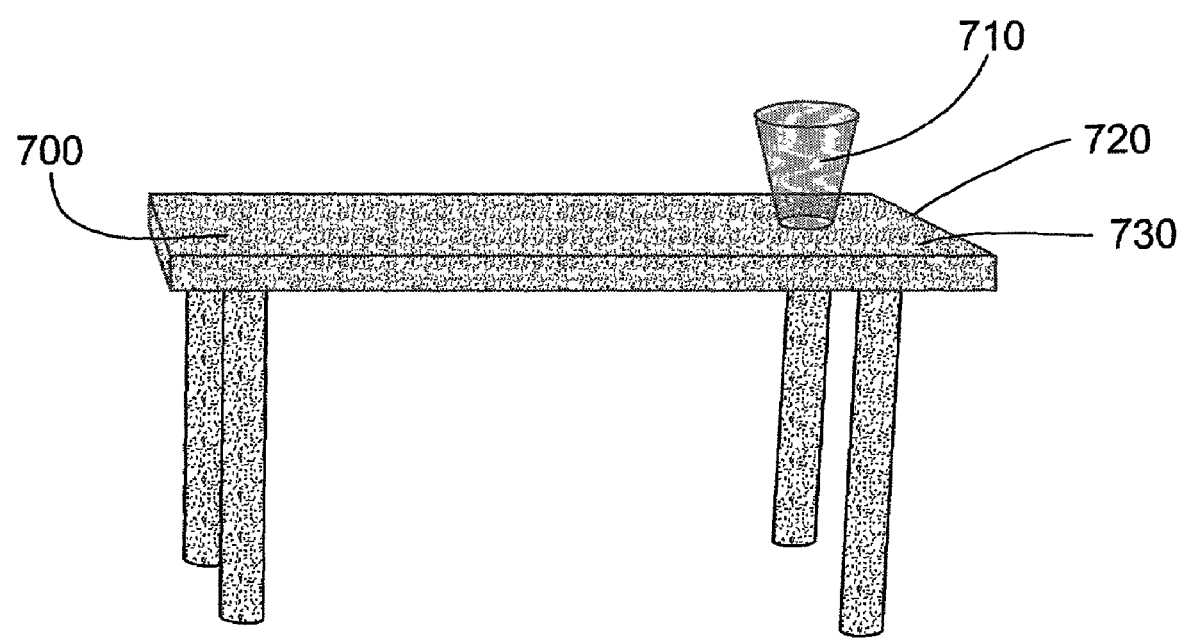
FIG. 16 shows a perspective view of a glass on a table.

Reference is now made to FIG. 16, which shows a table 700 with a tabletop 730 having a right side 720, and a glass 710 thereon. A table may take a glass at any position on an upper surface and thus the entirety of the upper surface may be defined as a continuous docking position. The location of the glass over the docking surface may be subsequently further adjusted.

Of course a secondary object could have more than one docking position, each of which may be of either utility or selective natures. Thus considering a chair 600 once again; whereas any of a plurality of different objects can be placed on the seat 650 thereof which as stated previously, is a utility docking position, the back 660 thereof might be a specific docking position restricted to the docking of jackets and similar items of clothing. Thus an alternatively strategy to dealing with the requirements of a tabletop might be to define a plurality of docking positions situated at strategic locations on the tabletop, such as near the edges, and in the center thereof.

Docking positions may be defined for secondary objects by associating anchor objects in desirable positions to enable primary objects to dock thereat. A number of anchor objects may be defined; these may be visible or invisible objects that serve as docking positions on specific objects. Secondary objects having a utility nature such as tables, may have non-specific anchor objects that enable the docking of a wide variety of objects. In addition, such objects might have a plurality of docking positions.

For objects having more specifically defined functions, anchor objects may be more specific, thus a plate could have a selective docking position, only suitable for docking food items for example. Thus a virtual electricity socket may only allow electric plugs to dock therein.

By way of illustration, with reference again to FIG. 11, showing a chess game; since during the course of play, chessmen 210 are moved only on the squares of a chessboard 200, and only one chessman may be situated on each square, each square may have a single docking station, for docking a single chessman, situated in the center thereof. Thus a particular chessman, for example the Black rook 220, may be selected in the usual way by being 'mouse-clicked', and 'dragged and dropped' from the current square G8 thereof, to a new position E8. It is important that there is no ambiguity as to where that new position is, that is, regarding the new square E8 for that piece. Further it is certainly desirable that the position of the chessman displays correctly from all allowable viewing angles. This may be achieved by having all chessmen dock automatically onto the squares on the chessboard, such that after docking, the selected chessman 220 is logically positioned, i.e. resting on, and in contact with, the selected square E8, and centered thereon. This is particularly applicable to chess, as chessmen can only rest on the squares of a chessboard, with a maximum of one chessman per square, or are removed completely from the game. Thus each square of a chessboard has one, centrally located, docking position that will accept any chessman, and will only accept one chessman at a time. Placing a chessman anywhere on or above an empty square of a chessboard will automatically dock that chessman onto that docking position in the center of that square. (In other games, such as Go for example, the docking position would be at the interstices at the corner of the squares).

Selection of objects for positioning may be carried out using a logical query, as mentioned above. Thus for example a logical query may be used to select all red tables for subsequent stacking. As mentioned above, the natural language feature can be used to define how the results of a query are to be presented. For example a query can ask for all red tables to be presented and stacked in a given corner.

Permissioning.

A third feature of the present embodiment, referred to herein as 'Permissioning', is a restriction mechanism, defining the set of interactions allowable to each user. Each user is assigned a role, and the server recognizes the role, and only allows the user to make changes that are permitted by that role. Roles and permissions are preferably changeable dynamically and/or interactively by the server or by individual users either directly or by using logical queries. Logical queries may be based on the context of the object (door is open or closed) or the context of the user, (player X has just become an enemy so player Y, the enemy of Z, becomes a friend).

Permission levels can be different for different parts of an object, for example a chest of drawers may comprise certain drawers openable by all participants and certain drawers openable only by participants having the role of parents.

Chess for example, has two well-defined roles, Black and White. For a game of chess to be playable, both of these roles require filling, (although either or both may be filled by a computer). A third role—that of an observer may also be defined.

Figure 17:
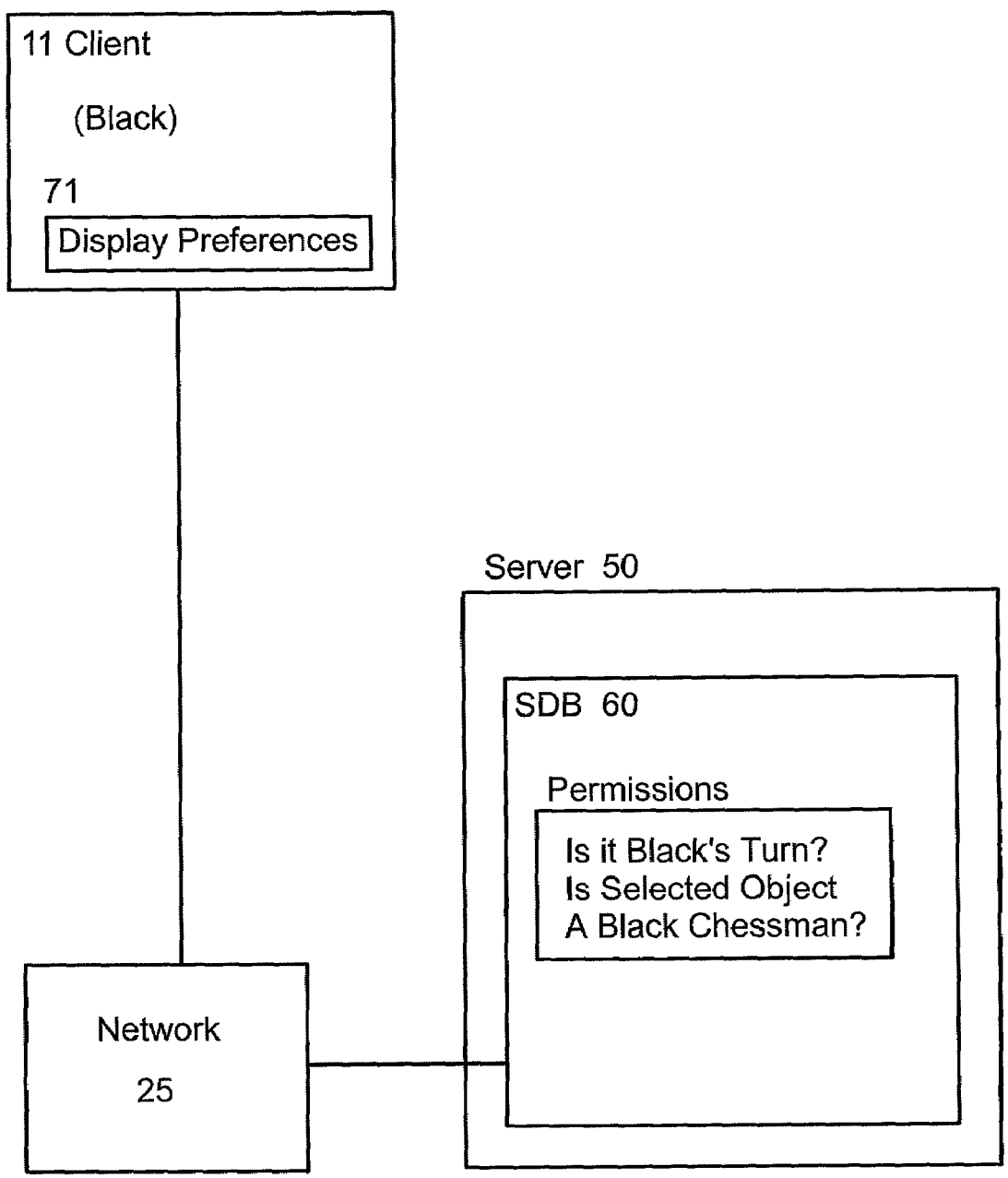
FIG. 17 shows a flow chart illustrating the 'Permission' feature of the present invention, with reference to the chess game shown in FIG. 9.

Reference is now made to FIG. 17, which is a functional block diagram showing schematically a user playing Black 11, a client 21, the network 25, the server Database 60 and the Permissions 70.

If the user 11 is assigned the role of Black, the user 12 is assigned the role of White, and a third user 13 is assigned the role of observer, and with reference to FIGS. 1, 11 and 17; the permission function would limit each player's allowable interactions to moving his/her own pieces, and that only if it is his/her turn. Thus Black 11 (the player having the black chessmen), only has permission to move black pieces. Further, having made his/her move, Black 11 can no longer make a further move until White 12 makes a move. Similarly, a third remote user 13, may be defined as an Observer, meaning that the he/she can view the game in virtual reality in real time, with the game displayed on his/her own terminal's 23 VDU 33 according to his/her selected preferences. Being defined as an observer to this chess-game however, the third user 13 will, of course, have no permissions to move any of the chessmen 210, but, like the players 11, 12, any Observer 13 may each display the scene according to personal preference by setting his/her Display Preferences 73.

This third feature is discussed herein with respect to chess, which is a game having rigid rules and all moves transmitted to the opponent as they are played. It will be appreciated that the above third feature is not limited to game applications of course. Rather games are discussed, merely by way of illustration, so that the reader will have little trouble understanding the point discussed.

Tool Tip

The fourth feature of the preferred embodiment is a 'Pop-up Tool-tip Menu'. This feature serves to inform the user of available options for interacting with various objects, and allows the user to select from those options. The 'Pop-up Tool-tip Menu' thus implicitly facilitates user interactions and permissions.

As the user moves the cursor around the screen of the VDU of his/her terminal, using the mouse, or other input device, the cursor moves around the virtual reality 3D scene. If the cursor is positioned over any 3D object or object that may be interacted with, a Pop-up Tool-tip appears at the cursor, listing all interactions available to that specific object. Using the mouse again, it is possible to click onto any item on the tool tip, thus selecting the item. The menu will thus limit the available interactions with any object.

Figure 18:
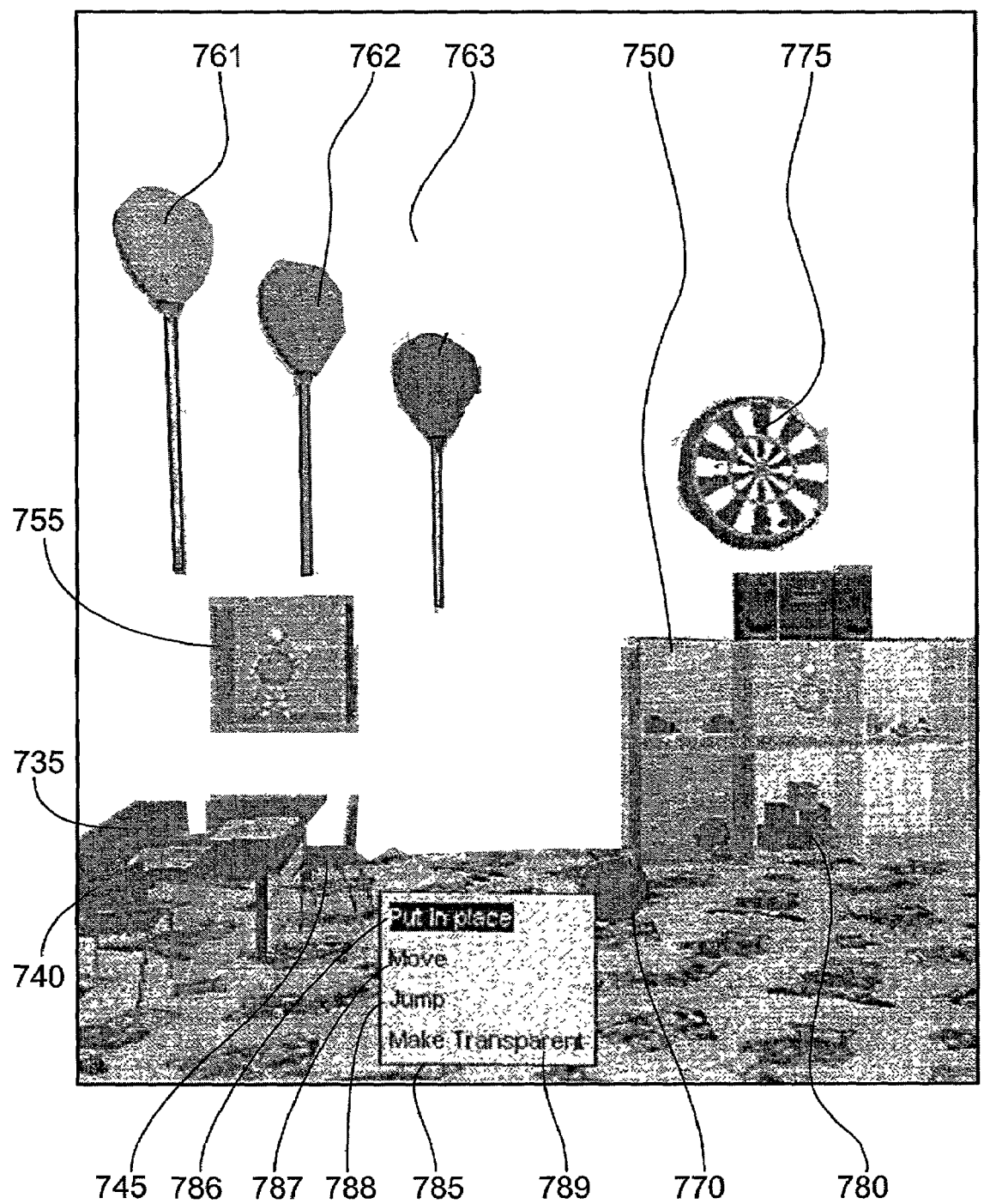
FIG. 18 shows a perspective view of a virtual children's playroom with a Pop-up Tool-tip Menu associated with a ball therein.

In a 'virtual home' embodiment for example, different users may be assigned the roles of different 'virtual family members'. Each virtual family member may have a different list of allowable interactions, for each object within the virtual home. In FIG. 18, a scene of a child's playroom in a virtual home is displayed. The room contains a table 735, two chairs 740 and 745, is shelving unit 750, a wall display unit 755, and various toys such as balloons 761, 762 and 763, a ball 770, a dartboard 775, and building blocks 780. If the cursor is situated over the ball 770, a 'Pop-up Tool-tip Menu' 785 appears. The 'Pop-up Tool-tip 785 presents the present user with four alternative interactions, and explicitly permits him/her to choose from: 'Put in place' 786, 'Move' 787, 'Jump' 788 and 'Make Transparent' 789. The interactions are those available from the ball object 770 to the user playing the role of the child for example. The parent user might have the additional alternative of 'Confiscate' for example.

Referring back to the display problem illustrated in FIGS. 3 and 4; by allowing docking to only occur at pre-selected docking points such as on the centers of each of the six sides of the blocks 120, 130, 140, 150, and having every available interaction shown on a 'Pop-up tool-tip Menu', the user may correctly stack the blocks. Similarly, with reference to the lamp and table shown in FIGS. 4 and 5, once the lamp 160 is placed over the table 170, a 'Pop-up Tool-tip Menu' may preferably be context sensitive, and may dynamically support all logical options, for example 'Place on center of tabletop'. Dynamic, context-sensitive tool-tips for 3D objects in virtual scenes are able to present clearly to users and to clarify logical alternatives and user permissions. If a tool-tip were placed over a closed door, the Pop-up Tool-tip Menu may offer Open Door as an option, and if placed over an open door, the Pop-up Tool-tip Menu may offer Close Door as an option.

EXAMPLE

A preferred embodiment of the present invention comprises a distributed, real time and interactive three-dimensional system, the core of which is a memory resident, real-time, object-oriented database called the SDB (Scene Database). By incorporating the new features of 'Functional Structuring for Networked Applications', 'object Positioning', 'Permissioning', and the 'Pop-up tool-tip menu', it is possible to facilitate controlled multi-client interaction with 3D virtual reality applications, with the individual users using standard 2D input devices such as the computer mouse for interacting with the program.

A prototype of the preferred embodiment was, wherewith the 3D virtual reality was perceived on standard 2D computer monitors, and was also perceived using special immersive equipment. The scene database was implemented in C++ and enables a large number of users to interact with a number of objects therein. The SDB was further developed to allow the creation of new objects in real-time.

The system may be used to create scenes such as virtual children's playrooms containing everyday objects such as chairs and blocks, which enable a plurality of users to interact. In addition games such as chess may be successfully played by networked users, and observed by a plurality of Observers.

In addition to other features of the Scene database, the prototype comprises objects having an internal coordinate system and the four features of 'Functional Structuring for Networked Applications', 'object Positioning', 'Permissioning', and 'Pop-up Tool-tip Menu' as described herein.

It will be appreciated by persons skilled in the art however, that the present invention is not limited to what has been particularly shown and described hereinabove. Rather the scope of the present invention is defined by the appended claims and includes both combinations and sub combinations of the various features described hereinabove as well as variations and modifications thereof, which would occur to persons skilled in the art upon reading the foregoing description.

It will be further appreciated that certain features of the invention, which are, for clarity, described above in the context of separate embodiments, may also be provided in combination in a single embodiment. Conversely, various features of the invention, which are, for brevity, described in the context of a single embodiment, may also be provided separately or in any suitable combination or sub-combination.

In the following claims, the term 'comprise', and variations thereof, such as 'comprising' and 'comprised' imply that the invention includes the elements listed, but is not necessarily restricted to those elements, and may additionally comprise other elements.

What is claimed is:

1. A computer implementing a virtual object for use in a virtual environment, the virtual object comprising at least a visible appearance element, and an object internal coordinate system supporting natural language positional commands in relation to said virtual object, said commands being for automatic, command based positioning within said virtual environment with respect to said virtual object, and having at least one docking location defined within said internal coordinate system, said docking position being defined for at least one of another object and an object type as a default location when said another object or object type is brought into association with said virtual object.

2. A computer implementing a virtual object as claimed in claim 1, wherein said internal co-ordinate system comprises unit lengths defined in terms of dimensions of a bounding shape of said virtual object.

3. A computer implementing a virtual object as claimed in claim 2, wherein said bounding shape has a width, a height and a depth, and said internal coordinate system comprises axes having a fixed direction with respect to directions of said width, height and depth.

4. A computer implementing a virtual object as claimed in claim 3, where said location is a preferred position for repositioning said virtual object.

5. A computer implementing a virtual object as claimed in claim 3, wherein said docking position is defined such that said virtual object and said other virtual object are logically displayed according to positioning logic associated with said virtual environment.

6. A computer implementing a virtual object as claimed in claim 5, wherein said designated location associated therewith is compatible with an unrestricted range of objects.

7. A computer implementing a virtual object as in claim 5, wherein said designated position associated therewith for selective positioning of a second object thereat is selectively compatible with a subset of objects.

8. A computer implementing a virtual object according to claim 1, wherein said internal co-ordinate system is any one of a group comprising: a polar coordinate system, a Cartesian coordinate system, a cylindrical coordinate system, a tetragonal coordinate system, and hexagonal coordinate system.

9. A computer implementing a virtual object as claimed in claim 8, movable to positions, in said virtual environment, express able in terms of said width, said height and said depth.

10. A computer implementing a virtual object as claimed in claim 9, wherewith said expressions of said locations comprise natural language description for each direction.

11. A computer implementing a virtual object as claimed in claim 10, where said natural language descriptions are selected from a group comprising left, leftwards, port, right, rightwards, starboard, up, upwards, above, down, downwards, below, forwards, near, ventral, fore, backwards, aft, dorsal, North, Northwards, Northerly, South, Southwards, Southerly, East, Eastwards, Easterly, West, Westwards, Westerly, North-Easterly, North-Westerly, South-Easterly, South-Westerly, and synonyms, combinations and translations thereof.

12. A computer implementing a virtual object as claimed in claim 10, arrangeable in terms of said expressions.

13. A computer implementing a virtual environment for user interaction, the environment comprising at least a first virtual object and a second virtual object and at least a relationship between them, wherein said relationship is selectable to specify, using an object internal coordinate system supported natural language positioning command, an action of said second object and said relationship is defaulted according to at least one of said first virtual object, said second virtual object, a type of said first virtual object and a type of said second virtual object.

14. A computer implementing a virtual environment as claimed in claim 13, wherein said relationship between said first virtual object and said second virtual object is any one of a group comprising a positioning relationship, a rotation, a deletion, a translation, a scaling operation, an animation activation, a change of color, a change of texture, a change in a status of the object, selection of the object from an object family, and change of object parameters.

15. A computer implementing a three dimensional virtual environment comprising at least one three dimensional virtual object and having a series of potential relationships of said virtual object with a relating other virtual object, each said relationship comprising a default relative position selected according to at least one of said relating other object and a type of said relating other object, said object having a tool tip facility and being selectable to display a tooltip, via said tooltip facility, said tooltip indicating at least some of said potential relationships, for interaction therewith in said virtual three dimensional environment via positioning commands of an object internal co-ordinate system supported-natural language, thereby to apply said default relative position by selection of one of said potential relationships.

16. A computer implementing a three dimensional virtual environment virtual object as claimed in claim 15, wherein said three dimensional virtual object has a bounding shape, wherein said bounding shape has a width, a height and a depth, and said internal coordinate system comprises axes having a fixed direction with respect to directions of said width, height and depth.

17. A computer implementing a virtual environment according to claim 15, wherein said indicated relationships are selectable from said tooltip.

18. A computer implementing a virtual environment as claimed in claim 15, wherein said tooltip is displayable automatically upon a cursor passing over said virtual object.

19. A computer implementing a virtual environment according to claim 15, wherein potential relationships are associated with parts of said object for display with said tooltip upon selection of said object part.

20. A computer implementing a virtual environment according to claim 15, wherein said relationship is a relationship with another object in said environment.

21. A computer implementing a virtual environment as claimed in claim 15, wherein said relationship is a positioning relationship via a predetermined preferential location associated with said second virtual object.

22. A computer implementing a virtual environment as claimed in claim 21, wherein said predetermined preferential location has a specific nature, selectively accepting predetermined types of objects.

23. A computer implementing a virtual environment as claimed in claim 15, which is common to a plurality of users.

24. A computer implementing a virtual environment as claimed in claim 23, wherein an interaction by a first user is detectable by at least a second user.

25. A computer implementing a virtual environment as claimed in claim 23, wherein an interaction by a first user is not detectable by at least a second user.

26. A computer implementing a virtual environment as claimed in claim 15, where said first object comprises at least a visible appearance element, and an internal coordinate system.

27. A computer implementing a virtual environment as claimed in claim 15, wherein said associated coordinate system is selected from a polar coordinate system, a Cartesian coordinate system, a cylindrical coordinate system, a tetragonal coordinate system, and hexagonal coordinate system.

28. A computer implementing a virtual environment as claimed in claim 15, wherein said virtual object further comprises a bounding shape having a width, a height and a depth, and said associated coordinate system has axes having a fixed direction with respect to directions of said width, height and depth.

29. A computer implementing a virtual environment as claimed in claim 28, wherewith locations in the vicinity of said object, are expressible in terms of said width, said height and said depth.

30. A computer implementing a virtual environment as claimed in claim 29, wherein said expressions of said locations comprise units for each direction with respect to a corresponding dimension of said boundary box.

31. A computer implementing a virtual environment as claimed in claim 29, wherein said expressions of said locations comprise natural language descriptions for each direction.

32. A computer implementing a virtual environment as claimed in claim 31, where said natural language descriptions are selected from a group comprising left, leftwards, port, right, rightwards, starboard, up, upwards, above, down, downwards, below, forwards, near, ventral, fore, backwards, aft, dorsal, North, Northwards, Northerly, South, Southwards, Southerly, East, Eastwards, Easterly, West, Westwards, Westerly, and synonyms, combinations and translations thereof.

33. A computer implementing a virtual environment according to claim 31, wherein at least one virtual object is selectable according to a query expressed using said natural language descriptions.

34. A computer implementing a virtual environment according to claim 31, wherein at least one virtual object is arrangeable according to a query expressed using said natural language descriptions.

35. A computer implementing a virtual environment as claimed in claim 29, wherein said location is a preferred position for positioning other objects thereat.

36. A computer implementing a virtual environment as claimed in claim 15, wherein said first virtual object has a designated location associated therewith for selective positioning of a second object thereat, so that first virtual object and second virtual object are logically displayed according to positioning logic associated with said virtual environment.

37. A computer implementing a virtual environment as claimed in claim 36, wherein said first virtual object has a designated location associated therewith for selective positioning of a second object thereat, where said designated location is compatible with any object.

38. A computer implementing a virtual environment as claimed in claim 37, wherein said designated location associated therewith for selective positioning of a second object thereat is selectively compatible with a subset of objects.

39. A method according to claim 36, wherein said automatic adjustment comprises associating said first object with a predetermined position on said second object and repositioning said first object to locate onto said predetermined position.

40. A method, to be performed on a computer, for moving a first virtual object from a first position to a selected second position associated with a second virtual object, within a virtual environment, each virtual object being approximated by a bounding box and having a respective internal co-ordinate system, the method comprising:
    selecting said first virtual object,
    defining a move of said first virtual object into proximity of said second virtual object using said first virtual object internal co-ordinate system, and a positioning command in a natural language, said natural language providing commands relating to the respective internal coordinate system of said first virtual object,
    operatively associating said first virtual object with said second virtual object, thereby automatically positioning said first virtual object with respect to said second virtual object in terms of said internal co-ordinate system of said first virtual object into a docking position, said docking position being a default position defined according to at least one of a first group comprising said first virtual object and a type of said first virtual object and at least one of a second group comprising said second virtual object and a type of said second virtual object.

41. A method according to claim 40, further comprising automatically adjusting positioning of said first object with respect to said second object so that said first object and said second object are logically displayed.

42. A method, to be performed on a computer, for constructing a menu of available and permitted user interactions with a first object having at least one user definable relationship within a virtual environment as claimed in claim 40, said method further comprising automaically displaying said menu to user.

43. A method, to be performed on a computer, for constructing a menu of available and permitted user interactions with a first object having at least one user definable relationship within a virtual environment which supports the default relative positioning between two virtual objects, said method comprising:
    automatically constructing a list of a priori user interactions characteristic of said first object;
    automatically adapting said list of user interactions by addition of a further list of optional interactions that characterize the at least one user definable relationship with a second object; and
    automatically providing said list as a menu, to be invoked by interacting with one of said virtual objects thereby to create a series of available default positioning commands, in an object internal co-ordinate system supported natural language, for said first object in relation to a second said object.

44. A method as claimed in claim 43, wherein said menu is displayable by locating a cursor over said virtual object.

45. A computer implementing a virtual environment, the virtual environemnt supporting a first virtual object having an associated menu of available interactions with other virtual objects, at least some of said objects belonging to an object type, said object having dynamically changeable states, said menu being changeable dynamically in accordance with changes of available interactions with surrounding objects consequent upon said changes in state, said menu permitting a user to define for at least one surrounding object or at least one surrounding object type at least one default association position, such that the position of said first virtual object in relation to said surrounding object is defaultingly selected according to at least one of a group comprising the interaction selected, the first object, the first object type, the surrounding object the surrounding object type.

46. A computer implementing a virtual object as claimed in claim 45, wherein said states are selected from appearance states, position states, and function states.

* * * * *